(12) United States Patent
Newman

(10) Patent No.: US 8,179,785 B1
(45) Date of Patent: May 15, 2012

(54) DETERMINISTIC SWITCHING PROTECTION OVER AGGREGATED LINKS

(75) Inventor: Aaron D. Newman, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 290 days.

(21) Appl. No.: 12/707,508

(22) Filed: Feb. 17, 2010

(51) Int. Cl.
*H04L 12/26* (2006.01)
(52) U.S. Cl. ........................................ 370/217; 370/242
(58) Field of Classification Search .......... 370/216–221, 370/242–245, 400, 401
See application file for complete search history.

(56) References Cited

U.S. PATENT DOCUMENTS

| | | | |
|---|---|---|---|
| 5,936,938 A * | 8/1999 | Weldon et al. ................ 370/228 |
| 6,260,158 B1 * | 7/2001 | Purcell et al. ................ 714/10 |
| 6,674,714 B1 * | 1/2004 | Mochizuki et al. ........... 370/217 |
| 6,683,890 B1 * | 1/2004 | Rossi et al. ................... 370/242 |
| 6,775,237 B2 * | 8/2004 | Soltysiak et al. ............. 370/241 |
| 6,914,878 B1 * | 7/2005 | Lindblom et al. ............ 370/219 |
| 2006/0114818 A1 * | 6/2006 | Canali et al. ................. 370/216 |

* cited by examiner

*Primary Examiner* — Hong Cho
(74) *Attorney, Agent, or Firm* — JW Law Group; James M. Wu

(57) ABSTRACT

An apparatus and method for improving network efficiency during an automatic switchover are disclosed. Upon receipt of a switching request from a first network peer ("NP") transmitted via a connection containing multiple links, a process capable of providing automatic switchover protection ("ASP"), in one embodiment, bring down all or multiple links simultaneously at the second NP in response to the switching request. When the links are ready to be brought up in accordance with APS pending state, the process temporarily suppresses network alarms to avoid higher level entities from entering link reset renegotiations.

20 Claims, 5 Drawing Sheets

| 8-bit Code | Type | Description |
| --- | --- | --- |
| 1 | Configure-request | Reset a ppp connection |
| 2 | Configure-Ack | |
| 3 | Configure-Nack | |
| 4 | Configure-Reject | |
| 5 | Terminate-request | |
| 6 | Terminate-Ack | |
| 7 | Code-Reject | |
| 8 | Protocol Reject | |
| 9 | Echo-Request | |
| 10 | Echo-reply | |
| 11 | Discard-Request | |
| ... | ... | |
| 36 | SWO-Req | Sent by an NP to initiate a switchover behavior. |
| 37 | SWO-Ack | Sent in response to a switchover request. |
| 38 | SWO-Nack | SWO mode is not entered. |
| ... | ... | |
| 256 | | |

FIG. 3

DETERMINISTIC SWITCHING PROTECTION OVER AGGREGATED LINKS

FIELD

The exemplary embodiment(s) of the present invention relates to network systems. More specifically, the exemplary embodiment(s) of the present invention relates to improve speed of aggregated links switching over from a primary connection to a redundant connection.

BACKGROUND

A high-speed network environment typically includes network devices such as routers and switches used for facilitating delivery of information packets and/or data traffic from source devices to destination devices via communication networks such as IP and/or packet-based networks. Information pertaining to the transfer of data packet(s) and/or frame(s) through the network(s) is usually embedded within the packet and/or frame itself. Each packet, for instance, traveling through multiple nodes via one or more communication networks such as Internet and/or Ethernet can typically be handled independently from other packets in a packet stream or traffic. Each node which may include routing, switching, and/or bridging engines processes incoming packet(s) or frame(s) and determines where the packet(s) or frame(s) should be forwarded.

To transmit data stream(s) over a distance, a modern communications network may use a point-to-point connection between two peers or nodes to facilitate data transfers. For example, a typical point-to-point connection between network elements ("NEs") or network peers ("NPs") can be a group of fiber optical links managed by one or more optical protocols. For instance, Synchronous Optical Networking ("SONET") or Synchronous Digital Hierarchy ("SDH") are multiplexing protocols capable of facilitating data transfer between source node and destination node via a group of optical fibers using lasers or light-emitting diodes ("LEDs").

To enhance reliability of a typical point-to-point network configuration, a backup cable or connection is employed wherein the backup connection takes over the responsibility of data transfer in the event that the primary connection fails. Switching from a primary connection to a backup connection, however, can take time and resources. For example, each side needs to renegotiate the protocol after the link is down and then up in a later time. Depending on applications, the process of renegotiation can consume time and render additional delay. As such, a conventional switchover from an active connection to a backup connection, overall network performance can be negatively impacted due to link renegotiations and packet re-sequencing.

SUMMARY

Embodiments of the present invention disclose a process of seamless and quick switchover using deterministic switching protection over aggregated links or link aggregation. For example, upon receipt of a switching request from a first network peer ("NP") transmitted via a connection containing multiple links, a process capable of providing automatic switchover protection ("ASP") bring down multiple links simultaneously at the second NP in response to the switching request. When the links are ready to be brought up in accordance with APS pending state, the process temporarily suppresses network alarms to avoid higher level entities from entering link reset renegotiations.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIG. 3 is a table illustrating exemplary link control protocol ("LCP") codes for switchover options in accordance with one embodiment of the present invention;

DETAILED DESCRIPTION

Figure 1:
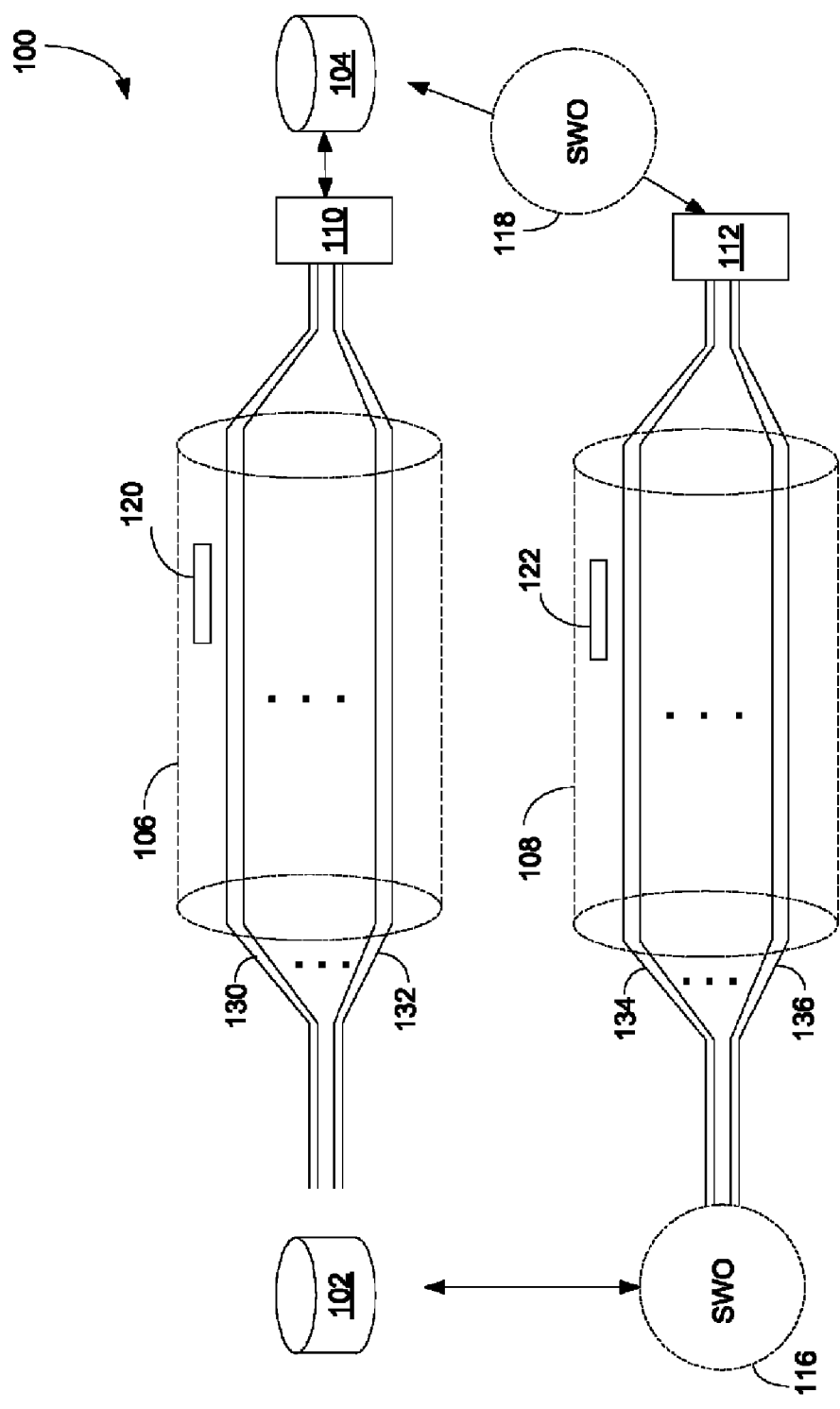
FIG. 1 is a block diagram illustrating a network configuration employing deterministic switching protection over aggregated groups in accordance with one embodiment of the present invention.

Exemplary embodiment(s) of the present invention is described herein in the context of a method, device, and apparatus of improving efficiency of aggregated links switchover from a primary connection to a redundant connection using switchover options.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. It, however, will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure unless otherwise defined.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items A process for seamless and quick switchover using deterministic switching protection over aggregated links or link aggregation is disclosed. Upon receipt of a switching request from a first network peer ("NP") transmitted via a connection containing multiple links, a process capable of providing automatic switchover protection ("ASP") bring down multiple links simultaneously at the second NP in response to the switching request. When the links are ready to be brought up in accordance with APS pending state, the process temporarily suppresses network alarms to avoid higher level entities from entering link reset renegotiations.

FIG. 1 is a block diagram illustrating a network configuration 100 employing deterministic switching protection over aggregated groups in accordance with one embodiment of the present invention. Network configuration 100 includes a first network peer ("NP") 102, a second NP 104, a connection 106, and a redundant connection 108 wherein NPs 102-104 are coupled by connection 106. Connection 106, in one embodiment, includes a group of aggregated links 130-132 capable of implementing multilink point-to-point ("MLPPP") protocol. It should be noted that the underlying concept of the exemplary embodiment(s) of the present invention would not change if one or more blocks (or elements or links) were added to or removed from configuration 100.

NP 102 or 104 is a network node, a router, a switch, a bridge, a network component, and/or a combination of nodes, routers, bridges, and/or network components. Alternatively, NP is a transceiver capable of transmitting and receiving optical and/or electrical signals. A function of NP 102 or 104 is able to perform an automatic switchover protection scheme, such as APS (Automatic Protection Switching), MLP, or FRR (Fast Reroute), wherein link payload contains aggregation groups or aggregated links, such as MLPPP, MLFR (Multilink Frame Relay), LACP (Link Aggregate Control Protocol), IMA (Inverse Multiplexing for ATM). To simplify the foregoing description, MLPPP is herein used as an exemplary protocol to illustrate various features of embodiments of the present invention.

Referring back to FIG. 1, NP 102 is coupled with NP 104 via connection 106. NP 102 can be alternatively referred to as a peer, a first NP, and/or a device. NP 104 may also be referred to as a remote peer, a second NP, and/or a remote network device. Note that various network components such as components 110-112 may be situated between NPs 102-104 for providing various different functions. Component 110, for example, is a SONET add-drop multiplexer configured to performing signal multiplexing between signals at NE 104 and NE 102.

Connection 106, in one embodiment, includes a group of aggregated links 130-132, wherein the links or multiple links can be divided into small sub-links or links capable of multiplexing multiple links. It should be noted that MLPPP aggregates multiple physical links into a single logical bundle as illustrated in FIG. 1. In one aspect, MLPPP bundles multiple link-layer channels into a single network-layer channel. NPs negotiate MLPPP during an initial phase of Link Control Protocol ("LCP") negotiation. To enhance the speed of switchover from connection 106 to redundant connection 108, a set of unique LCP switchover options 120 are employed. For example, a switchover request option initiates a process of bringing down all physical links 130-132 simultaneously.

Similarly, redundant connection 108 also includes a group of aggregated links 134-136, wherein the multilink can be divided into small links capable of multiplexing multiple links. As discussed earlier, redundant connection 108 is a backup connection that takes over the responsibility of data transfer between NPs 102-104 when connection 106 fails. While MLPPP is able to aggregate multiple physical links into a single logical bundle, MLPPP is also capable of bundling multiple link-layer channels into a single network-layer channel. To improve the speed of switchover as well as seamless switchover from connection 106 to redundant connection 108, a set of unique LCP options 122 is employed to bring down and then reestablish all physical links 130-132 as quickly as possible.

Connection 106 and redundant connection 108 are considered as one-to-one redundancy and/or protection during a normal operation. When an active connection such as connection 106 fails, a switchover from an active connection 106 to a standby or redundant connection 108 takes place. To minimize data loss and/or network down time during a switchover as indicated by SWO 116 and/or 118, various switchover protection schemes such as APS are implemented to achieve seamless switchover and minimize network down time.

In an exemplary operation, upon detecting connection or link(s) failure, NP 104 sends an LCP option 120 indicating a switchover request ("SWO-Req") via connection 106. After receipt of SWO-Req, NP 102 sends an LCP option indicating a switchover acknowledged ("SWO-Ack") to acknowledge the switchover request. NP 102, in one embodiment, brings or tears down all links 130-132 simultaneously. Alternatively, the connection or all links are transited to an APS pending state. During the APS pending state, some higher-level link alarms are temporarily suppressed to minimize loss of traffic. It should be noted that a series of confirmation-acknowledgement LCP options are communicated to verify each open link.

In the event that NP 102, however, cannot enter the switchover mode due to some types of faults or failures, NP 102 sends an LCP option of a switchover not acknowledged ("SWO-Nack") notifying that the switchover mode can not entered and normal LCP link renegotiation should be initiated. The switchover mode, in one embodiment, is a switching process using deterministic switching protection over aggregated links. The list of failure(s) that can block entering the switchover mode will be discussed later.

An advantage of applying switchover using deterministic switching protection over aggregated links is to reduce network down time due to a switchover to a standby connection. Note that a faster and seamless switchover minimizes data loss and enhance overall network performance.

Figure 2:
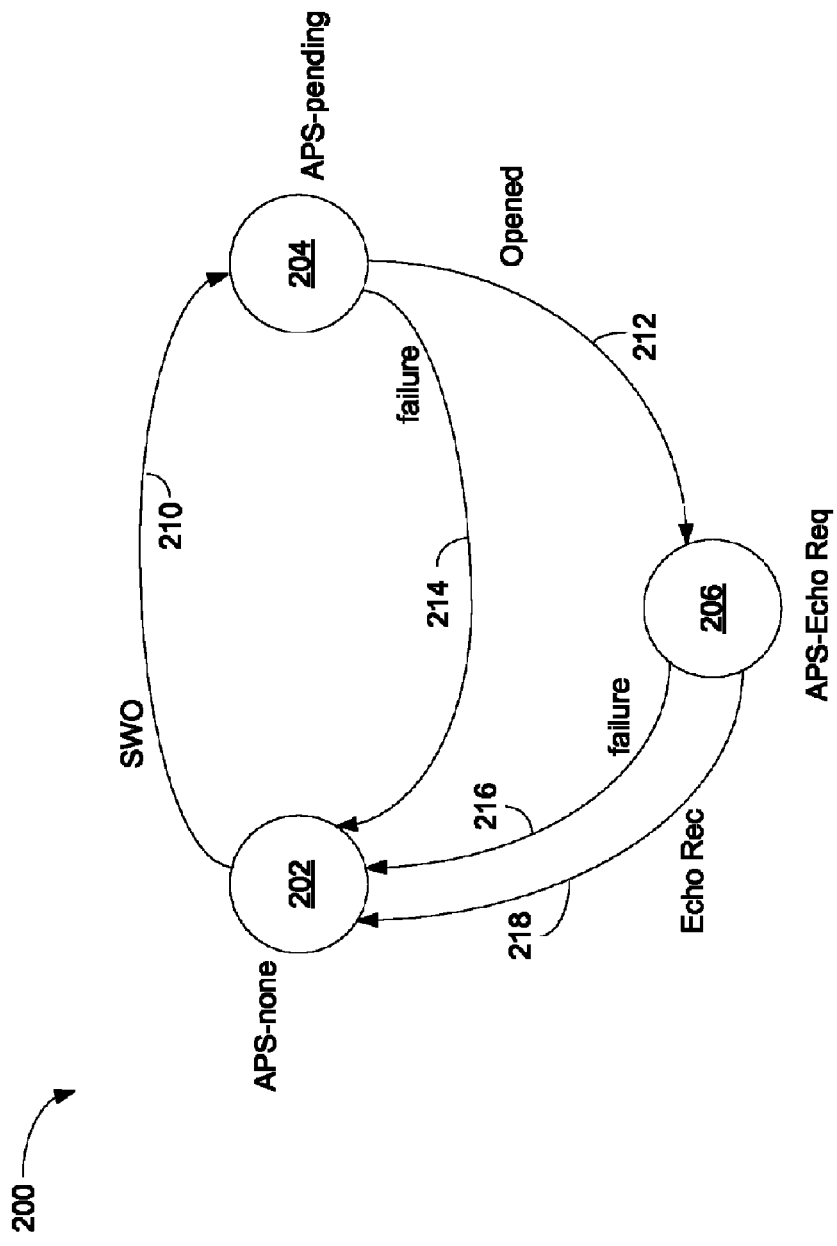
FIG. 2 is a diagram illustrating a LCP state machine showing transitions in response to occurrence of event(s) in accordance with one embodiment of the present invention.

FIG. 2 is a diagram 200 illustrating a LCP state machine showing transitions in response to occurrence of event(s) in accordance with one embodiment of the present invention.

Diagram 200 includes an APS-none state 202, an APS Pending state 204, and an APS-Echo Request state. Links or connection can transit to different state(s) depending on the occurrence of one or more events. It should be noted that the underlying concept of the exemplary embodiment(s) of the present invention would not change if one or more state were added to or removed from diagram 200.

In one aspect, upon an occurrence of switchover ("SWO") 210, a LCP state machine transits from APS-none 202 to APS-Pending 204. After a link 212 is opened, the state machine proceeds from APS-Pending 204 to APS-Echo Request 206 to verify the connectivity. Upon receipt of an Echo-Reply or Echo-Rec 218, the state machine moves from APS-Echo Request state 206 to APS-none state 202. If all links are verified, the switchover is completed. Alternatively, upon occurrence of any failures 214-216 at APS-Pending state 204 or APS-Echo Req state 206, the state machine proceeds to APS-none 202, and normal LCP renegotiation process will be subsequently initiated for verifying link connectivity.

Referring back to FIG. 2, APS-none state 202, APS Pending state 204, and APS-Echo Req state 206 are considered as APS switchover state and used for each link in an ML group. Depending on applications, additional state(s) may be added or removed to implement the APS switchover state. To implement a deterministic switching protection over aggregated links, the switchover process tears down all links simultaneously and subsequently brings up all links as efficiently as possible in accordance with the APS switchover state diagram. For example, after an occurrence of a SWO event, all links will be transited to APS Pending state 204. While in this state, LCP and higher-level link alarms are temporarily suppressed. Temporary suspension of alarms, for example, can reduce or minimize additional traffic loss due to layer 3 protocol failures. It should be noted that while at APS-pending state 204 or APS-Echo-Req state 206, the LCP state machine can reduce or reset LCP link Time Out ("TO") value(s) from predefined default value(s) to speed up the verification-acknowledgement process.

In an operation, an NP sends an LCP echo over a link after it is opened. Since open links will respond to LCP echo requests, receipt of echo responses verify that the links are open and verified. Once a link has reached an open status, the LCP state machine enters APS-Echo Req 206 and sends an LCP echo to the remote side. If APS-Echo Req 206 times out on a link before it receives an Echo response, the implementation retries by resending the conf-ack LCP options. When the number of echo retries exceeds a predefined limit, or if the implementation chooses not to resend the acknowledgement(s) due to a failure or failures, the implementation transits to APS-none state 202.

If an implementation determines that a switchover has failed for a given link, it transits APS-None state 202. Note that when a link enters APS-None state 202, conventional normal alarms and timer functionalities are restored. The following list illustrates exemplary events that can cause an APS link failure.

1) Timeout of overall APS switch time;
2) Receipt of new or unsupported options on a given link;
3) Receipt of an LCP conf-req retransmission;
4) Receipt of an LCP nack or reject from the peer;
5) Physical link failure; and
6) Administrative change to the link or ML group.

An advantage of using deterministic switchover over a link aggregation is to optimize switching efficiency when one or both NPs are terminated by an APS pair such as SONET APS pair. It should be noted that the deterministic switchover is applicable to any automatic protection schemes. The switchover can be accomplished by means of new PPP options that allow links to be torn down at the same time, and restart links quickly.

FIG. 3 is a table 300 illustrating exemplary LCP codes for switchover options 302 in accordance with one embodiment of the present invention. LCP, in one aspect, negotiates and/or renegotiates connection and parameters to configure the data link layer of a PPP connection. The connection can be a cable that contains a group of aggregated links capable of multiplexing for data transfer between a point to a point. Table 300 illustrates LCP packet code format wherein the first eight (8) bits are reserved for code or vendor-specific code. The first eleven (11) options have been reserved for 11 options as shown in table 300.

It should be noted that the underlying concept of the exemplary embodiment(s) of the present invention would not change if one or more options were added to or removed from table 300.

Referring back to table 300, while SWO-Req is assigned a code 36, SWO-Ack and SWO-Nack are assigned to codes 37 and 38, respectively. It should be noted that SWO options do not have to be 36 to 38 and they can be any number between 12 and 256. A function of SWO-Req is that it initiates a switchover behavior. SWO-Ack option, on the other hand, is issued in response to a switchover request. Note that when SWO-Ack is received, it indicates that the peer has all links moved to the starting state, and has started the switchover timer. SWO-Nack indicates that the SWO mode is not entered due to failure of some conditions. A normal LCP negotiation will take place when SWO-Nack is issued.

LCP packet format further includes a field of sequence number and a field of vendor code. The field of sequence number, not shown in table 300, is one octet or an 8-bit element used for packet sequencing for a data stream. Due to time-sensitivity in nature during an APS switchover, a peer or NP can elect to retransmit multiple requests over multiple links. Note that duplicate requests should be silently ignored.

The field of vendor code, not shown in FIG. 3, allows a user to specify which switchover protection mechanisms to use. For example, the vendor code can indicate using a proprietary or a pre-defined APS mechanism for the switchover implementation. In one embodiment, vendor codes are pre-defined such as 00 or 01. For example, vendor code "00" indicates Generic uni Peer ("UP") which implements an APS model. In other words, the code "00" is used if the vendor does not implement APS, but may be located behind a SONET ADM. Alternatively, vendor code "01" indicates Generic NP which implements an APS model. For this situation, vendor uses code "01" if the vendor implements APS natively in the SONET switching equipment. Note that other vendor codes can be added or removed depending on the applications.

During an operation, behavior of a system using SWO LCP options to deterministically provide switching protection over aggregated Groups performs the following steps: 1) reducing the timer values; 2) options not supported on the far end do not need to be renegotiated since the remote peer is assumed not to change and the options supported will not change; 3) Higher-level entities dependent on ipcp/bcp (internet protocol control protocol) can be kept in a "hold up" state for a short period of time.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 4:
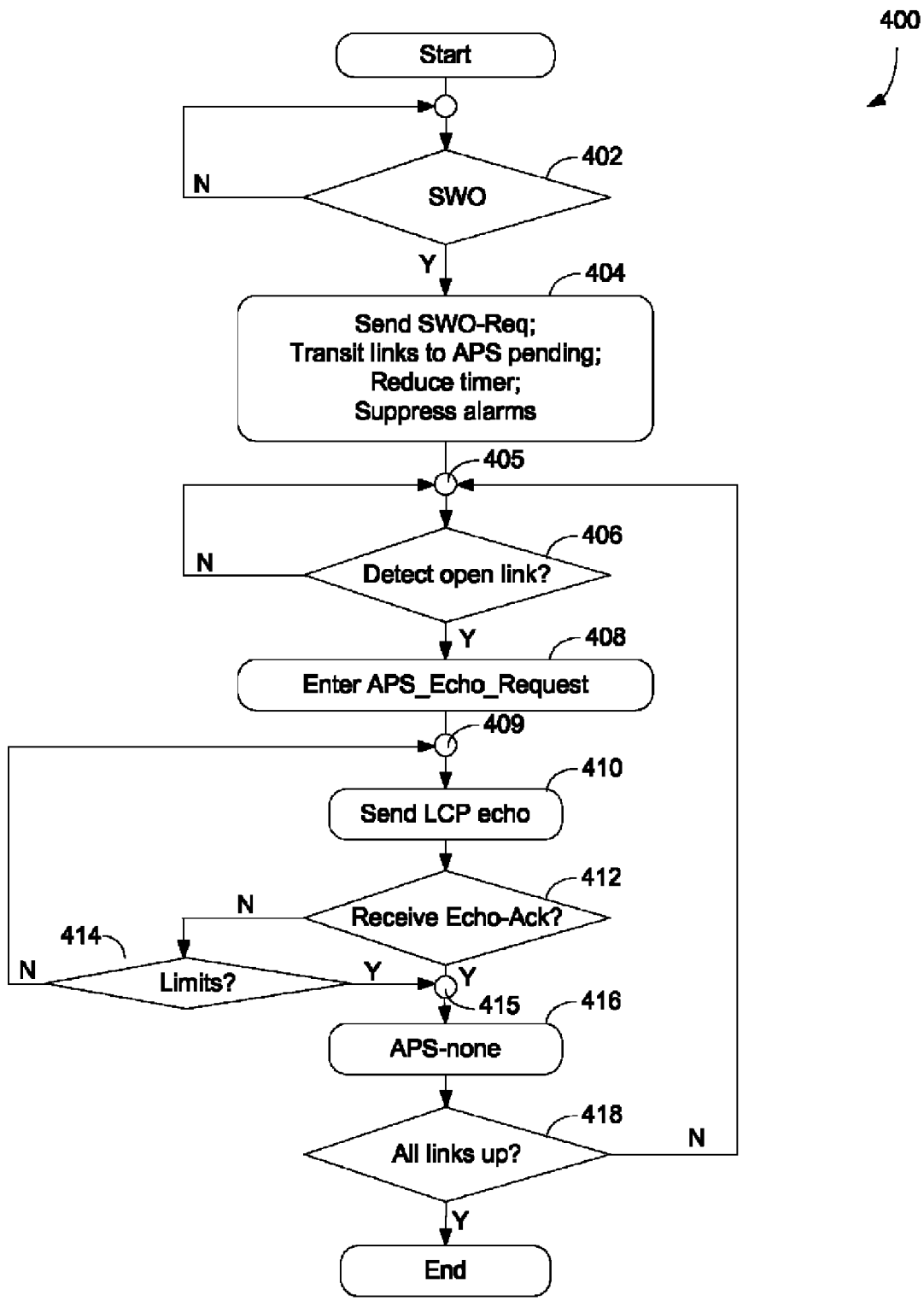
FIG. 4 is a flowchart illustrating a process of deterministic switchover using automatic switchover protection ("ASP") and switchover LCP options in accordance with one embodiment of the present invention.

FIG. 4 is a flowchart 400 illustrating a process of deterministic switchover using ASP and switchover LCP options in accordance with one embodiment of the present invention. At block 402, when a process of deterministic switchover detects a switchover scenario, it proceeds to block 404. Otherwise, the process loops back until the next SWO scenario is detected.

At block 404, after sending or broadcasting SWO-Req to a remote peer, the process transits all links to the APS Pending state. Note that the SWO-Req is a special message traveling between the NPs via aggregated links indicating that a switchover has taken place. Upon adjusting or reducing timer or timers, various types of alarms are temporarily suppressed. After receipt of SWO-Req option, all links are brought down together simultaneously instead of one at a time. Note that suppressing alarms can be maintained for a short period of time. As such, the switchover needs to be completed within the short period of time.

The process detects any open link(s) at block 406 and it proceeds to block 408 when at least one open link is detected. Otherwise, the process stays at block 406. After entering the APS-Echo Req state, the process sends an LCP echo or APS echo option to verify the open link(s) at block 410. Upon receipt of LCP Echo response or acknowledgement at block 412, the process proceeds to the APS-none state at block 416. If the LCP Echo response fails to arrive within the allowed time limit, the LCP echo is sent again at block 414 by loop the process back to node 409 if a predefined limit for sending has not been reached. Otherwise, the process enters APS-none state 416 via node 415. Note that at the APS-none state, normal LCP renegotiation takes place. The process checks to see whether all links are up and running at block 418. If it is, the process ends. Otherwise, the process loops back to node 405 until every link is open and verified.

Depending on the applications, links can be brought up in different orders or sequence. For example, receiver side is usually being brought up before transmitter side. Upon bringing down the links at once, the process brings up the links as quickly as possible with certain sequences dictated by the APS switchover state. If none of the higher level entities are aware of switchover, suppressing alarms and/or high level messages for a short period of time can be achieved. It should be noted that link(s) may lose some data packets, but the connectivity between NPs are maintained. The process will, however, buffer the data stream and/or packets as much as possible before they are discarded. Note that higher level layers are not aware of switchover, and thus renegotiation of links is not initiated.

Figure 5:
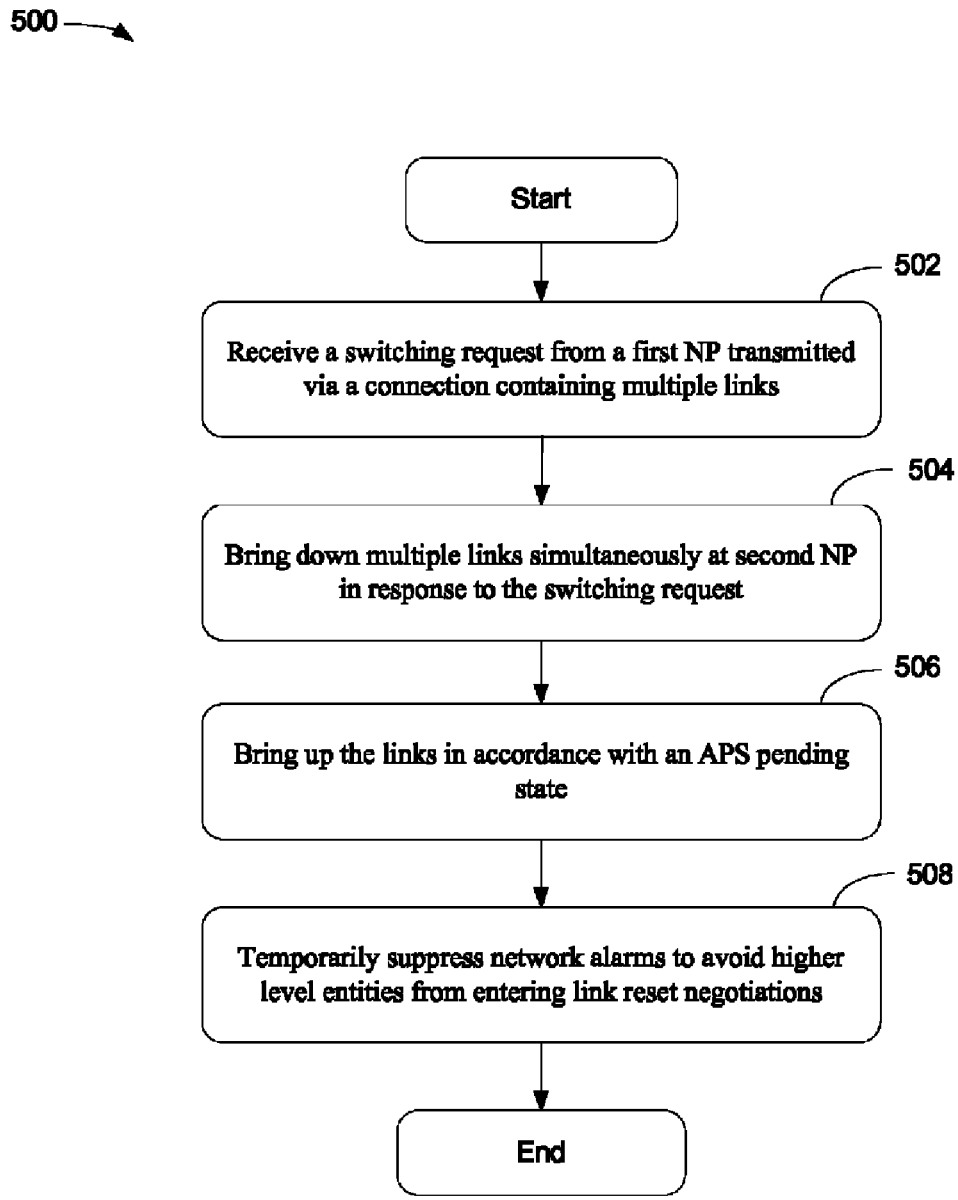
FIG. 5 is a flowchart illustrating a process of deterministically switchover from a primary connection to a backup connection using switchover options in accordance with one embodiment of the present invention.

FIG. 5 is a flowchart 500 illustrating a process of deterministically switchover from a primary connection to a backup connection using switchover options in accordance with one embodiment of the present invention. At block 502, a process, in one embodiment, receives a switching request from a first NP transmitted via a connection containing multiple links. Note that the switching request can be a SWO-Req LCP option. In one example, the process is capable of obtaining the SWO-Req from a remove peer located at one end of a link employing MLPPP.

At block 504, the process brings down multiple links simultaneously at the second NP in response to the switching request. In an alternative embodiment, all links are moved to starting state and starting a switchover timer. Note that starting state is a state that links are ready to be opened after they had been torn down.

At block 506, the process brings up the links in accordance with APS Pending state. After transiting all links to the APS pending state, a SWO-Ack LCP option is forwarded or broadcasted. The process further sends an APS-Echo-Req when a link is opened.

At block 508, the process is able to temporarily suppress network alarms to prevent higher level entities from entering link reset negotiations. In one embodiment, the process is capable of maintaining logical connectivity between the first NP and a second NP during a switchover from a first data link to a second data link. For instance, the process facilitates logical link connectivity while a switchover from a primary data connection to a redundant data connection is taken place. Note that higher-level entities are kept in a hold-up state for a predefined short period of time.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for automatic switchover in a network, comprising:
   receiving a switching request from a first network peer ("NP") transmitted via a connection containing multiple links;
   bringing down a plurality of links simultaneously at a second NP in response to the switching request;
   bringing up the plurality of links in accordance with an automatic protection switching ("APS") pending state; and
   temporarily suppressing network alarms to avoid higher level entities from entering link reset renegotiations.

2. The method of claim 1, further comprising maintaining logical connectivity between the first NP and a second NP during a switchover from a first group of data links to a second group of data links.

3. The method of claim 2, wherein maintaining logical connectivity between the first NP and a second NP during a switchover from a first group of data links to a second group of data links includes facilitating link connectivity while a switchover from a primary data connection to a redundant data connection.

4. The method of claim 1, wherein receiving a switching request from a first network peer ("NP") transmitted via a connection containing multiple links further includes receiving a switchover request ("SWO-Req") formatted as link control protocol ("LCP") option.

5. The method of claim 4, wherein receiving a SWO-Req includes obtaining the SWO-Req from a remote peer located at one end of aggregated links employing multilink point-to-point protocol ("MLPPP").

6. The method of claim 1, wherein bringing down the plurality of links simultaneously includes moving the plurality of links to a starting state and starting a switchover timer.

7. The method of claim 1, wherein bringing up the plurality of links includes transiting all links to the APS pending state and sending a switchover acknowledge ("SWO-Ack") formatted as LCP option.

8. The method of claim 7, wherein transiting all links to the APS pending state further includes sending an automatic protection switching echo request ("APS-Echo-Req") when a link is opened.

9. The method of claim 1, wherein temporarily suppressing network alarms includes keeping higher-level entities in a hold-up state for a predefined short period of time.

10. A network system, comprising:
a network peer ("NP") capable of implementing automatic switchover;
a remote NP capable of implementing automatic switchover;
a connection having a first end and a second end, the first end of the connection coupled to the NP, the second end of the connection coupled to the remote NP, where the connection is configured to support multilink point-to-point protocol ("MLPPP") and link control protocol ("LCP"); and
a redundant connection where a first end of the redundant connection is coupled to the NP and a second end of the redundant connection is coupled to the remote NP, wherein the NP is capable of broadcasting a switchover request ("SWO-Req") over LCP indicating that a switchover is taking place.

11. The network system of claim 10, wherein a switchover is able to switch from the connection to the redundant connection.

12. The network system of claim 11, wherein the remote NP is capable of bringing down all communications traveling through the connection in response to the SWO-Req.

13. The network system of claim 12, wherein the remote NP broadcasts a switchover acknowledge ("SWO-Ack") to indicate that all links are ready to switch to the redundant connection.

14. The network system of claim 11, wherein the remote NP sends a switchover not-acknowledge ("SWO-Nack") in response to the SWO-Req if the remote NP declined to implement switchover.

15. A method for switchover protection, comprising:
receiving a switchover request from a first network peer ("NP") transmitted via a first group of aggregated links operable within multilink point-to-point protocol ("MLPPP");
bringing down the first group of aggregated links simultaneously in response to the switchover request;
switching over from the first group of aggregated links to a second group of aggregated links;
suppressing network alarms to avoid from entering link renegotiations; and
verifying the links in accordance with automatic protection switching ("APS") pending state.

16. The method of claim 15, further comprising maintaining logical connectivity between the first NP and a second NP during a switchover from a first group of data links to a second group of data links.

17. The method of claim 16, wherein maintaining logical connectivity between the first NP and a second NP during a switchover from a first group of data links to a second group of data links includes facilitating link connectivity while a switchover from a primary data connection to a redundant data connection.

18. The method of claim 15, wherein bringing down the group of aggregated links simultaneously in response to the switchover request includes moving all links to starting state and starting a switchover timer.

19. The method of claim 15, wherein verifying the links in accordance with automatic protection switching ("APS") pending state includes transiting all links to the APS pending state and sending a switchover acknowledge ("SWO-Ack") formatted as LCP option.

20. The method of claim 19, wherein transiting all links to the APS pending state further includes sending an automatic protection switching echo request ("APS-Echo-Req") when a link is opened.

* * * * *